April 16, 1946.　　　P. F. SHIVERS　　　2,398,470
ALTIMETER
Filed Dec. 18, 1942　　　2 Sheets-Sheet 1
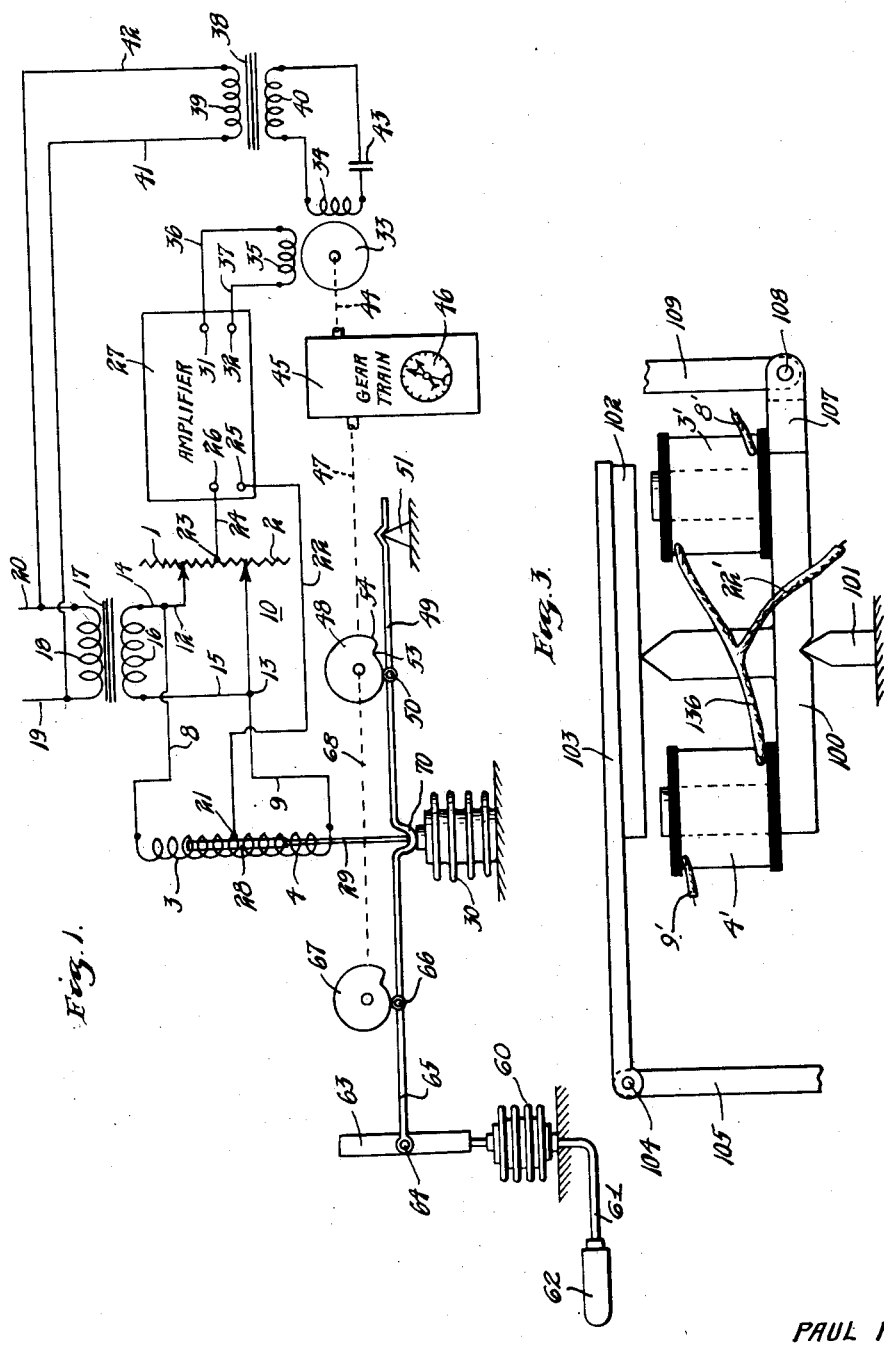
Inventor
PAUL F. SHIVERS
By
George H. Fisher
Attorney

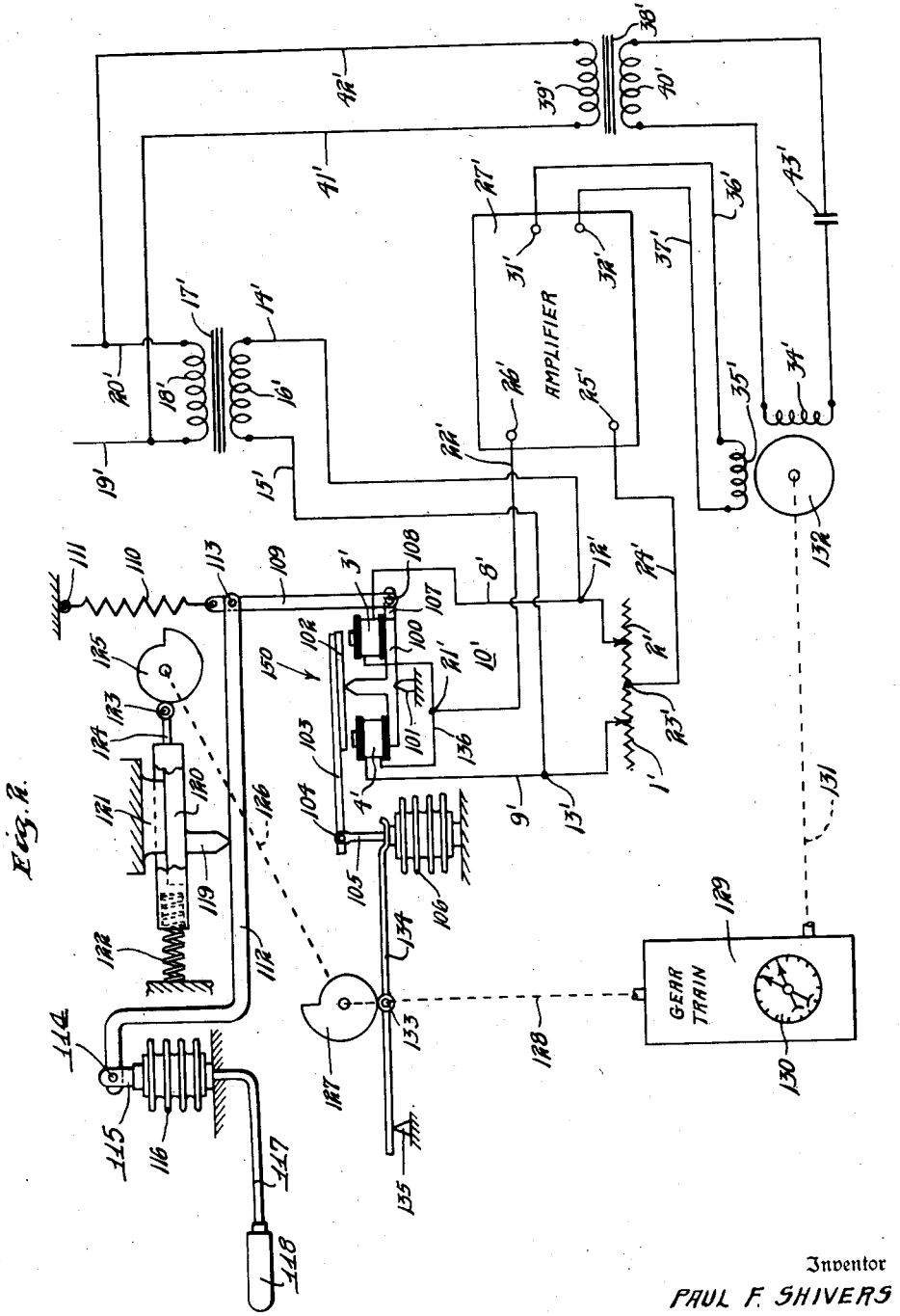

Patented Apr. 16, 1946

2,398,470

UNITED STATES PATENT OFFICE 2,398,470

ALTIMETER

Paul F. Shivers, Edina, Minn., assignor to Minneapolis-Honeywell Regulator Company, Minneapolis, Minn., a corporation of Delaware Application December 18, 1942, Serial No. 469,398

17 Claims. (Cl. 73—386)

The present invention relates to pressure measuring devices of the type for indicating the magnitude of quantities by measuring the density of a gas mass whose variable density is parametric of the quantity whose magnitude is to be indicated, and more particularly to a measuring instrument of a type such as discussed in my co-pending application Serial No. 466,283 filed November 20, 1942.

My invention is particularly adapted for use in the measurement of altitudes and is of a type wherein the altitude indication depends directly on the static, that is, barometric, atmospheric pressure. As discussed in detail in my above noted application, the altitude indication of such an instrument is influenced directly by the density of the gas mass and indirectly by the effect of the temperature of the gas mass on its density.

For the sake of uniformity in instrument dial calibration, certain arbitrary values of density and temperature have been selected to define a "standard atmosphere." This standard atmosphere is of such density as to give a barometric pressure at a point one foot above sea level equal to that of a column of mercury 29.92 inches high. The temperature gradient in the standard atmosphere is such that at sea level the temperature is 59° F., while the temperature is −67° F. at the bottom of an isothermal layer which has been found to exist at a variable height which is approximately 35,000 feet in middle latitudes. In this standard atmosphere the barometric pressure has been found to have an inverse logarithmic relation to the altitude above sea level.

The atmosphere surrounding a craft in flight is not normally the standard atmosphere, however, but differs therefrom in sea level static pressure and in temperature gradient. Thus, when the temperature drop for a given increase in altitude is greater than the assumed standard for which the measuring instrument may be calibrated, in order to approximate the true altitude an increase in the altitude indication based upon such assumed standard must be made, as shown graphically in the aforenoted co-pending application, the amount of such increase is dependent upon the altitude at which such correction is made. Further, where the temperature drop is less than that for the assumed standard for which the device is calibrated a decrease in the altitude indication must be made in an amount likewise dependent upon the altitude level at which such correction is made.

It is an object of my invention therefore to provide normal control means whereby an altitude indication resulting solely from static pressure may be corrected for atmospheric temperature conditions so that such corrected altitude indication may more nearly approximate the true altitude.

Another object of my invention is to provide mechanical means responsive to atmospheric temperature conditions for applying a biasing force to an atmospheric pressure responsive measuring member so as to compensate said member for changes in atmospheric pressure due to a change in temperature.

Another object of my invention is to provide variable cam means for controlling the application of such a biasing force to the responsive member in response to atmospheric pressure and temperature conditions or in response to either of said conditions separately.

Another object of my invention is to provide means responsive to atmospheric pressure conditions for applying a biasing force to a temperature responsive measuring member so as to vary the temperature compensation afforded thereby in accordance with the atmospheric pressure level at which said compensation is applied.

Another object of my invention is to provide an improved impedance transmitter device for electrical control systems including a movable armature member and a movable core member, each of which is separately adjustable in position with relation to the other under the influence of independent condition responsive devices; said control members cooperating so as to differentially accomplish a single function.

A further object of my invention is to provide in such an impedance transmitter device connection means whereby one of said members may be controlled by atmospheric pressure responsive means and the other member may be controller by atmospheric temperature responsive means for correcting the indicated altitude of an altimeter for changes in temperature.

Further objects and advantages of this invention are set forth in the following description, taken with the accompanying drawings, and the novel features thereof are pointed out in the appended claims. The disclosure, however, is illustrative only and I may make changes in detail, especially in matters of shape, size, and arrangement of parts within the principle of the invention, to the full extent indicated by the broad general meanings of the terms in which the appended claims are expressed.

In the accompanying drawings wherein like reference characters indicate corresponding parts of the various figures.

Figure 1 represents diagrammatically one form of my invention,

Figure 2 represents a modified form of my invention,

Figure 3 represents an enlarged detailed view of my improved impedance transmitter.

In the form of my invention illustrated in Figure 1 there is provided an impedance bridge circuit indicated generally by the numeral 10 and including variable resistances 1 and 2 and impedance coils 3 and 4. The resistance 1 is connected to the impedance coil 3 by a conductor 8 while the resistance 2 is connected to the impedance coil 4 by a conductor 9.

The conductors 8 and 9 are further connected by conductors 14 and 15 to a secondary winding 16 of a transformer 17, as at input terminals 12 and 13 respectively. Primary winding 18 of the transformer is connected by conductors 19 and 20 to a suitable source of alternating current whereby an alternating current is induced through transformer action in the secondary winding 16 and passes through the conductors 14 and 15 to input terminals 12 and 13 of the bridge circuit 10.

Coils 3 and 4 as shown in Figure 1 are connected to an output terminal 21 to which there is in turn connected an output conductor 22, while the variable resistances 1 and 2 are connected to an output terminal 23 to which there is in turn connected an output conductor 24. The output conductors 22 and 24 are connected to input terminals 25 and 26 of a suitable amplifier indicated by the numeral 27.

It will be readily seen that the coils 3 and 4 form two arms of the bridge circuit 10. The variable resistance windings 1 and 2 form the opposite arms of the bridge circuit 10.

Coacting with the coils 3 and 4 is a movable core or armature 28 of magnetic material. Core 28 is operably connected by a rod 29 to atmospheric pressure responsive member or aneroid 30.

The bridge circuit 10 is so arranged that normally with core 28 positioned substantially equally within the two coils 3 and 4 the bridge circuit 10 is balanced and no signal potential appears across output terminals 21 and 23.

However, upon a decrease in atmospheric pressure causing the expansion of the aneroid 30, core 28 moves upward. The core 28 then approaches further toward or extends further into the coil 3 and correspondingly moves further from or projects less into the other coil 4. The magnetic flux through the coil 3 increases, increasing the impedance of the coil 3. On the other hand, the flux through the coil 4 decreases, decreasing the impedance of the coil 4 and causing the potential of the output terminal 21 to shift from a value half way between that of input terminals 12 and 13 to a value somewhat closer to that of input terminal 13. The potential of output terminal 23, however, is not changed: therefore a potential difference exists between output terminals 21 and 23, and the time phase of this potential difference is the same as if output terminal 21 were connected directly to input terminal 13 and output terminal 23 were connected directly to input terminal 12. This potential difference is fed through output conductors 22 and 24 to input terminals 25 and 26 of amplifier 27.

Further, upon an increase in atmospheric pressure causing contraction of aneroid 30 and therefore downward movement of the core 28 past the point at which bridge circuit 10 reaches balance, the impedance of the coil 3 is decreased and the impedance of the coil 4 is increased, causing the potential of the output terminal 21 to shift from a value exactly half way between that of input terminals 12 and 13 to a value somewhat closer to that of input terminal 12. The potential of output terminal 23, however, is not changed; therefore a potential difference exists between terminals 12 and 13, and the time-phase of this potential difference is the same as if terminal 21 were connected directly to terminal 12 and terminal 23 were connected directly to terminal 13. This potential difference is then fed directly to terminals 25 and 26 of amplifier 27 through conductors 22 and 24.

The amplifier 27 may be of any suitable type of electronic amplifier well known in the art such as shown for example in Patent No. 1,586,233 granted May 25, 1926, to Anschutz-Kaempfe or may be preferably an electronic amplifier of the type shown and described in the co-pending application of Albert P. Upton, Serial No. 437,561, dated April 3, 1942. The amplifier 27 is provided, as previously described, with the input terminals 25 and 26 and is further provided with output terminals 31 and 32.

A motor 33 is shown as being of the split phase type having a pair of field windings 34 and 35. Winding 35 is connected by the conductors 36 and 37 to the output terminals 31 and 32 of the amplifier 27.

A transformer 38 is provided for energizing the motor winding 34, said transformer having a primary winding 39 and a secondary winding 40. Primary winding 39 is connected by conductors 41 and 42 to conductors 19 and 20 which are in turn connected to a suitable source of alternating current. Current is supplied to secondary winding 40 through transformer action from the primary winding 39. Motor winding 34 is continuously energized from the secondary winding 40 of the transformer 38. A condenser 43 is connected in series between the secondary winding 40 and the motor winding 34 and causes a phase displacement of substantially 90° between the current flowing in the winding 34 and the terminal voltage of the secondary winding 40.

As described in detail in the co-pending Upton application previously referred to, amplifier 27 is of the type which produces in the branch of the output circuit including conductors 36 and 37 and motor winding 35 an alternating current of the same phase as the potential applied to input terminals 25 and 26. Since transformer primary windings 18 and 39 are both connected to the same alternating current supply lines 19 and 20, it will be understood that the potential appearing at the terminals of the secondary windings 16 and 40 are of the same phase. The current flowing through winding 34 is, however, shifted substantially 90 electrical degrees with respect to this potential by the condenser 43 as previously explained. The winding 35, on the other hand, is supplied with current either in phase or 180° out of phase with the terminal potential of windings 16 and 40 depending upon the direction of unbalance of the bridge circuit 10.

In accordance with the well known characteristics of a split phase motor, when the windings 34 and 35 are supplied with current 90° out of phase, the motor 33 is caused to rotate in a predetermined direction. The operation of a split phase motor of the type described herein is described in the co-pending Upton application previously referred to.

The motor 33 is adapted to drive a shaft 44 in a direction depending upon the unbalancing of the bridge circuit 10 and the resultant current supplied from the amplifier 27 to the motor 33. The shaft 44, in turn, is adapted by suitable means such as a gear train 45 to drive an indicator means 46, which is of a suitable type well known in the art. Moreover, the motor 33 is further adapted by suitable means such as a shaft 44, train of gears 45 and shaft 47, to turn a cam 48 so as to adjust the tension of a loading spring 49 for purposes which will hereinafter be explained. The cam 48 cooperates with a roller 50 mounted on the loading spring 49 for the adjustment of the tension of the spring 49. The loading spring 49 is pivoted at one end on a fixed knife edge 51 and engages aneroid 30 at a portion 70 intermediate the opposite ends, exerting a tension thereon dependent upon the adjustment of the spring 49.

It will thus be seen that upon a decrease in pressure the aneroid 30 expands forcing the rod 29 upward against the tension of the spring 49. Moreover, such upward movement of the rod 29 likewise moves the core 28 upward which, as previously explained, increases the impedance of the coil 3 and decreases the impedance of the coil 4 and thereby causes an unbalancing of the variable reluctance bridge circuit 10. The unbalance potential is amplified by the amplifier 27 in a manner previously described and the resultant amplified electro-motive force drives the motor 33 so as to rotate the shaft 44 in a direction to cause actuation of the indicator means 46 in a manner well known in the art so as to indicate an increase in altitude. Moreover, the motor 33, upon such unbalancing of the bridge circuit 10, turns the shaft 44, shaft 47, and intermeshing gear means 45 so as to turn the cam 48 in a counterclockwise direction so as to cause a downward movement of the roller 50, thereby increasing the tension exerted by the spring 49 on the aneroid 30. This in turn causes a contraction of the aneroid 30, under atmospheric pressure and the additional tension of the loading spring 49, to cause downward movement of the rod 29 until the core 28 is once again positioned in such a manner that bridge circuit 10 is balanced, whereupon the signal potential across output terminals 21 and 23 disappears, and motor 33 ceases the actuation of the cam 48 and the indicator means 46.

Further, upon an increase in atmospheric pressure above the balancing point of the bridge circuit 10 as in the case of a decrease in altitude, the aneroid 30 contracts, causing a downward movement of the rod 29 and hence causing the core 28 to increase the impedance of coil 4 and to decrease the impedance of coil 3. The amplified potential resulting in the unbalance of circuit 10 now causes rotation of the motor 33 in a direction opposite to that in the preceding paragraph, moves the indicator means to indicate a decrease in altitude and moves cam 48 in a clockwise direction so as to decrease the tension of the loading spring 49. The decreasing tension of the spring 49 permits expansion of the aneroid 30 and upward movement of core 28 to a position such that the bridge circuit is again balanced, whereupon the signal potential disappears and action of the motor 33 terminates. The movement of motor 33 will thus stop until such time as the bridge circuit 10 is once again unbalanced.

The cam 48, which turns in a counter-clockwise direction as the altitude increases, is so shaped that the pitch of the actuating cam surface decreases as the cam is rotated, so as to progressively decrease the increment of vertical displacement applied to the roller 50 per unit of atmospheric pressure change as the altitude readings of the indicator increase. Thus, at ground level, the cam 48 is positioned as shown in Figure 1 with the roller contacting the cam surface near its region of minimum radius 53, and upon a decrease in pressure the aneroid 30 expands upward. Since the cam 48 is constructed so that at this point the relative movement of the cam 48 necessary to lower the roller 50 to increase the spring tension 49 to balance the circuit per unit of pressure change is relatively slight, the indicator recordings for such movement are correspondingly slight per unit of pressure change. However, at relatively high altitudes with the cam 48 correspondingly adjusted so that the roller 50 approaches the cam end 54, considerably greater rotary movement of the cam 48 is necessary to cause sufficient increase in spring tension to turn the core 28 so as to balance the circuit. This increases the necessary rotary movement of the shaft 47 to cause a correspondingly greater indicator movement per unit of pressure change. This variation in the multiplication ratio of the indicator means as the altitude increases is necessary in order to approximate the true altitude, since as is well known in the art, the vertical distance traveled for each unit of pressure change increases with the altitude.

In order to more accurately adjust the altimeter for the barometric pressure at the lower end of the air column from which the measurement is to be predicated, I have made the resistances 1 and 2 adjustable. Under assumed standard starting or ground level conditions they are of equal resistance. The variable resistances 1 and 2 may be adjusted simultaneously or separately, so that upon a decrease in barometric pressure at the starting level below the assumed standards the resistance 1 may be increased and the resistance 2 decreased in accordance with a predetermined adjustment scale, thereby unbalancing the bridge circuit 10 and causing a potential difference to appear across output terminals 21 and 23. This potential is amplified, as previously explained, causing rotation of motor 33 so as to decrease the altitude readings and to turn the cam 48 in a clockwise direction, rotation of the cam decreasing the ratio between indicator increments and units of pressure change, at the same time decreasing the tension exerted by the loading spring 49 on the aneroid 30. The decrease in tension of spring 49 in turn permits the core 28 to rise so that the impedance of coil 3 is increased and the impedance of coil 4 decreased to a point whereupon the bridge circuit 10 is once again balanced. Thus, correction may be effected for altitude readings which if uncorrected would be too high due to a decrease in the pressure of the air column at the ground or starting level of the measurement.

Further, upon an increase in the ground barometric pressure causing the altimeter at an assumed standard of operation to indicate an altitude below the true altitude, the resistance 1 may be decreased and the resistance 2 increased by suitable adjustment means in accordance with a predetermined adjustment scale unbalancing the previously balanced bridge circuit 10 so that a potential difference appears across output terminals 21 and 23, which in turn causes motor 33 to rotate so as to turn the indicator 46 to increase the indicated altitude. The motor 33 also turns the cam 48 in a counter-clockwise direction so as to increase the ratio between indicator increments and units of pressure change at the same time increasing the tension of spring 49 whereupon the atmospheric pressure acting upon the aneroid 30 together with the increased tension of spring 49 forces the core 28 downward until the impedance of coil 4 is increased and the impedance of coil 3 decreased to a point whereupon the bridge circuit 10 is once again balanced. The increase of atmospheric pressure for the column of air above the assumed standard is thus compensated and the indicator standard adjusted to increase the altitude readings which would under the uncorrected assumed indicator standard be too low. Thus, the standard of operation of the altimeter may be adjusted for the actual atmospheric conditions existing at the ground or starting level of the measurement.

The structure which I have heretofore described in operation is substantially the same as the structure previously described by me in my co-pending application Serial No. 466,283, filed November 20, 1942. However, there is disclosed in my present application a novel mechanical temperature compensating means not heretofore disclosed. Such means is provided for varying the operative standard of the altimeter in accordance with any deviation in the mean temperature from an assumed standard.

As previously explained, an increase in mass atmospheric temperature above an assumed standard causes a higher indicated altitude at the assumed standard measure, attributable to the expansion of the mass or column of atmospheric air caused by the increase in the temperature. Similarly, a decrease in mass atmospheric temperature below the assumed standard causes a lower indicated altitude at the assumed standard measure, attributable to the contraction of the mass or column of atmospheric air due to the decrease in temperature. Thus, it will be seen that under a given set standard of operation varying altitude readings may result at a given altitude level depending upon the state of the air column, whether contracted or expanded.

In order to correct the operating standard or translation factor of the altimeter for such errors, I have provided in the form of my invention illustrated in Figure 1 a free air temperature responsive member 60 which is shown as being of the fluid filled bellows type. The lower end of the member 60 has connected thereto a connection 61 formed of a tubular material which connects with a free air thermometer bulb element of the distance type indicated by numeral 62. The thermometer bulb element 62 is structurally mounted so as to contact the free atmospheric air so that the fluid within the bulb element will respond to the temperature of the free atmospheric air. It will thus be readily seen as is well known in the art that as the free air temperature decreases, the fluid within the thermometer bulb 62, tube 61, and bellows 60 will be caused to contract causing thereby the contraction of the bellows 60. Connected to the upper end of the bellows 60 is a rod 63 which has connected thereto one end 64 of a spring portion 65 of the leaf spring 49. The opposite end of the leaf spring 49 is mounted on pivot 51 and an intermediate portion 70 bears upon the aneroid 30. Mounted on the spring portion 65 intermediate the portion 70 and end 64 is a roller 66 adapted to engage a cam 67 which is in turn connected by a shaft 68 to the cam 48. Thus, upon adjustment of cam 48 through the shaft 47, the cam 67 is likewise adjusted by the shaft 68. The cam 67 bears upon the roller 66 so as to vary the tension exerted by the spring portion 65 upon the aneroid 30 in a manner similar to the action of the cam 48 and roller 50 previously described.

In operation it will thus be seen that as the altitude increases as indicated by a decrease in atmospheric pressure the cam 48 rotates in a counter-clockwise direction together with the cam 67, increasing the tension applied on the aneroid 30 through the springs 49 and 65 for returning the aneroid to zero or neutral position. Further, when the altitude decreases as indicated by an increase in atmospheric pressure cams 48 and 67 rotate in a clockwise direction for decreasing the tension applied to the springs 65 and 49 so as to permit the return of the aneroid to its neutral or zero position. Indicator 46 driven by the motor 33 indicates the altitude corresponding to the increased or decreased pressure at the aneroid 30.

However, in the event there is a deviation in the temperature of the free atmospheric air from the assumed standard, aneroid 30 is subjected to a force having the combined effect of springs 65 and 49 and the force of the atmospheric pressure. The atmospheric pressure in turn is comprised of two components, the barometric pressure proportional to the altitude according to the standard atmosphere, and a further pressure, which may be positive or negative, due to the difference between the density of air at the altitude and at the standard temperature and that of air at the altitude and at the prevailing temperature. The position taken by the indicator in response to the resultant atmospheric pressure, as balanced by the tension in springs 49 and 65 must be further corrected by a factor proportional to the change in air pressure due solely to its change in density with change in temperature. This factor is introduced by expansion or contraction of the bellows 60 in response to changes in ambient temperature. On a drop in temperature, contraction of bellows 60 causes a decrease in the biasing force applied on the aneroid 30 through the spring portion 65, thus tending to allow core 28 to move upward, unbalancing bridge circuit 10 and energizing the motor 33 to rotate the cams 48 and 67 in a counter-clockwise direction and the indicator 46 so as to increase the indicated altitude. Such action, combined with the response of the device to changes in resultant air pressure, causes the aneroid 30 to return to its zero or normal position.

Similarly, a decrease in the temperature of the free atmospheric air at a rate less than that for the assumed standard, or an increase in temperature, causes adjustment by the bellows 60 of the spring portion 65 so as to increase the relative tension applied thereby upon the aneroid 30, causing thereby the relative downward movement of the core 28 and accordingly a decrease in the reading of the indicator 46 and a corresponding movement of the cams 48 and 67 in a clockwise direction so as to decrease the tension applied upon the springs 65 and 49, returning the aneroid 30 to a position where circuit 10 is balanced.

The cam 67 is so shaped that the variation in temperature from an assumed standard will have a proper increased corrective effect as the altitude increases. Thus such correction of altitude for temperature is applied in accordance with the altitude level at which such temperature is measured. This is specifically accomplished by constructing the cam 67 so that the pitch of the actuating cam surface varies in proper proportion for the application of such temperature corrective factor as the cam turns in response to change in atmospheric pressure or altitude. Thus as the altitude increases the rotary movement of the cam 67 necessary in combination with the cam 48 to cause the return of the aneroid 30 to the starting or bridge circuit 10 balanced position increases per unit of temperature change, thus increasing the correction applied to the indicator 46 per unit of temperature change as the altitude increases.

I have shown that, under standard temperature conditions, an increase in altitude acts through aneroid 30 to unbalance bridge 10; the cams 48 and 67 then cause the leaf spring 49 and its spring portion 65 to apply an increasing pressure on the aneroid 30 as the atmospheric temperature and pressure decrease in accordance with such standard and thus cause the operation of the indicator 46 under such assumed standard conditions.

However, if the temperature at a given altitude is greater than the standard, expansion of bellows 60 increases the pressure of portion 70 on aneroid 30. The magnitude of this increase is of course dependent upon the pressure level at which such measurement is made. This increase in spring tension compresses aneroid 30, resulting in the unbalancing of the bridge circuit 10. A decrease in the altitude reading of the indicator 46 thus results, cams 48 and 67 being simultaneously turned in a clockwise direction by the motor 33 for return of the aneroid 30 so as to cause the rebalancing of the bridge circuit 10. Similarly an increase in the altitude reading of the indicator 46 results upon the temperature at a given pressure level being less than that for the standard. Thus I have provided novel means for compensating an altimeter for temperature in accordance with the atmospheric pressure level at which such temperature is measured so that the indicated altitude of such instrument may more accurately approximate the true altitude.

A second form of my invention is illustrated in Figure 2 wherein there is provided an electronic control circuit similar to that previously described in Figure 1. There is provided, however, in Figure 2 a novel improved impedance transmitter device indicated generally by numeral 150. My impedance device 150 includes a core member 100 mounted on the pivot member 101. Core member 100 is of a generally E-shaped configuration. On the left and right E legs of the core member 100 are mounted impedance coils 3' and 4' corresponding to the impedance coils 3 and 4 previously noted in regard to Figure 1.

Pivotally supported on the center leg of the core member 100 is an armature member 102 mounted at one end of an adjustment arm 103. The adjustment arm 103 is pivotally attached at 104 to one end of an actuating arm 105 which engages at the other end an aneroid 106 of conventional form.

Mounted on the E-shaped core member 100 at one side of the pivot 101 is an actuating arm 107 pivotally connected at 108 to one end of a link member 109. The link member 109 is connected at the opposite end to a spring 110. Spring 110 is fastened at 111 and arranged so as to tend to bias the E-shaped core member 100 in a counter-clockwise direction about the pivot 101. An actuating arm 112 is pivotally connected at 113 to the link 109 and is pivotally connected at the opposite end at 114 to an arm 115 mounted at the movable end of a temperature responsive bellows 116. The opposite end of the bellows 116 is fixedly fastened and has connected thereto at one end a conduit 117 which connects at the opposite end to a thermometer bulb 118 of the distance type which is preferably mounted so as to contact the free atmospheric air. Provided in the bellows 116, conduit 117, and bulb 118 is an expansive fluid of a type well known in the art responsive to temperature whereby upon a decrease in temperature a relative contraction of the bellows 116 results, while upon a temperature increase a corresponding expansion of the bellows 116 occurs. Such adjustment of the bellows 116 causes a corresponding adjustment of the arm 115. The arm 112 is pivotally mounted intermediate the opposite ends thereof upon an adjustable pivot 119 fixedly mounted on a sliding member 120 supported by a member 121 and biased by a spring 122 towards the right as shown in Figure 2. Provided at the right end of the slide 120 is a roller 123 rotatably mounted in a bifurcated arm 124. Under tension of the spring 122, the roller 123 engages the cam surface of a rotatable cam 125. The cam 125 is attached by a shaft 126 to a second cam 127 driven by a shaft 128, mechanically connected by a suitable gear train 129 to an indicator 130 driven through a shaft 131 by a motor 132 as will be explained.

The cam 127 bears upon a roller 133 pivotally mounted on a leaf spring 134 fastened at one end to a knife edge 135 and bearing at the opposite end upon the aneroid 106. Upon an increase in altitude cams 127, 125 are rotated in a counter-clockwise direction under the influence of motor 132 and the cam 127 thereby increases the tension applied through the spring 134 to the aneroid 106. The pitch of the actuating cam surface of the cam 127 decreases as the cam is turned in such a counter-clockwise direction in a like manner to cam 48 previously explained in reference to Figure 1.

Further, such counter-clockwise rotary movement of the cam 127 is accompanied by a corresponding counter-clockwise movement of the cam 125 which in turn causes a movement of the sliding member 120 towards the right as the altitude increases varying thereby the position of the pivot member 119 in relation to the arm 112. Of course suitable anti-frictional means may be provided between the pivot 119 and the rod 112 such as suitable bearings provided within a slotted portion of said arm or other suitable means well known in the art may be provided. However, for the purposes of illustration of my invention herein such pivot 119 is merely shown as of a knife edge structure.

Upon a decrease in altitude causing a clockwise movement of the cam 125 the roller 123 follows the cam surface of the cam 125 under the tension of the biasing spring 122 and thus the slide 120 is forced by the cam 125 towards the left thereby shifting the pivot point 119 in this direction. The pitch of the cam surface of cam 125 is arranged so as to decrease as the altitude increases so as to effect the proper temperature compensation for each pressure level as previously explained with reference to cam 67 of Figure 1. It will thus be seen as the altitude increases the pivot point of the lever 112 is shifted so as to vary the leverage exerted by the spring 110 and the bellows 116 through the lever 112 on the link 109 so that at high altitudes a unit of temperature change will cause a greater corrective effect due to a leverage advantage than a corresponding unit of temperature change at lower altitudes and causing through the cooperation of cam 125 a more accurate adjustment of the indicated altitude for each atmospheric pressure level.

Thus upon a temperature decrease the bellows 116 contracts, actuating the arm 115, lever arm 112, and link 109 against the biasing force of the spring 110 so as to in turn rotate the E-shaped armature in a counter-clockwise direction tending thereby to increase the air gap between the left arm of the core member 100 and the armature 102 and to decrease the air gap between the right arm of the core member 100 and the armature 102. Obviously, upon an increase in temperature, the bellows 116 tends to expand causing movement of the arm 115, lever 112 and link 109 under the biasing force of spring 110 so as to move the E-shaped core member in a clockwise direction thereby increasing the air gap between the right arm of the core member 100 and the armature 102 and decreasing the air gap between the left arm of the core member 100 and the armature 102. The purpose of such adjustment will be explained hereinafter.

Similarly, upon an increase in altitude, causing thereby, a decrease in atmospheric pressure upon the aneroid 106, the aneroid 106 expands causing the movement of arm 103 and armature 102 in a clockwise direction about the center arm of the core member 100. Such movement causes a lessening of the air gap between the armature 102 and the right arm of the core member 100 and the widening of the air gap between the armature 102 and the left arm member of the core member 100. An increase in atmospheric pressure as upon a decrease in altitude causes an opposite adjustment of the armature 102 in a counter-clockwise direction about the center arm of the core member 100 causing the lessening of the air gap between the armature 102 and the left arm of the core member 100 while widening the air gap between the armature 102 and the right arm of the core member 100. The purpose of such adjustment will be explained hereinafter.

Referring to the variable impedance device 150 the coil 3' is connected at one end to the opposite end of the coil 4' by the electrical conductor 136. The other end of the coil 3' is connected by conductor 8' to an end of the variable resistance 2' while the other end of the coil 4' is connected by a conductor 9' to an end of the variable resistance 1'. The variable resistances 1' and 2' are in turn connected together. The conductors 8' and 9' are further connected at input terminals 12' and 13' respectively by conductors 14' and 15' to a secondary winding 16' of a transformer 17'. The primary 18' of the transformer is connected by conductors 19' and 20' to a suitable source of alternating current whereby an alternating current is induced through transformer action into the secondary winding 16' and through the conductors 14' and 15' to input terminals 12' and 13'.

It will be readily seen that the coils 3' and 4' form two arms of a bridge circuit 10'. The variable resistance windings 1' and 2' form the opposite arms of the bridge circuit 10' and are adapted to be adjusted for ground atmospheric conditions. The coils 3' and 4' are wound in the same direction and the electrical connections as will be readily seen are such that the magnetic flux produced by both coils 3' and 4' is of the same polarity at any instant.

Coils 3' and 4' as shown in Figure 2 are connected to an output terminal 21' to which there is in turn connected an output conductor 22' while the variable resistances 1' and 2' are connected to an output terminal 23' to which there is in turn connected an output conductor 24'. The output conductors 22' and 24' are connected to input terminals 25' and 26' of a suitable amplifier indicated by the numeral 27'. The amplifier 27' is of a type previously described in relation to amplifier 27 shown in Figure 1.

A motor 132 is shown as being of the split phase type having a pair of field windings 35' and 34'. Winding 35' is connected by conductors 36' and 37' to the output terminals 31' and 32' of the amplifier 27'.

A transformer 38' is provided for continuously energizing the motor winding 34'. The transformer 38' having a primary winding 39' and a secondary winding 40'. The primary winding 39' is connected through conductors 41' and 42' to conductors 19' and 20'. A condenser 43' is connected in series between the secondary winding 40' and the motor winding 34' and causes a phase displacement of substantially 90° between the current flowing in the winding 34' and the terminal voltage of the secondary winding 40'. The motor 132 upon an unbalancing of the bridge circuit 10' operates in a manner similar to motor 33 described in detail in reference to Figure 1 and therefore it is not deemed necessary to repeat such detailed description.

As previously noted the coils 3' and 4' are arranged so that the magnetic flux produced by both coils 3' and 4' is of the same polarity at any instant. In other words, when the flux produced by coil 3' is downward in direction, the flux produced by coil 4' is also downward. Each coil may therefore be said to produce a flux which tends to oppose the flow through that coil, of flux produced by the other coil.

The magnetic flux produced by coil 4' may be traced assuming the flux direction to be downward and moving in a counter-clockwise direction through the left leg of the core member 100, through the lower portion of the core member 100 and up the center portion of the core member 100 to the armature 102, left on the member 102 and down across the air gap to the left leg of the core member 100.

The magnetic flux produced by coil 3' may be similarly traced assuming the direction downward and moving in a clockwise direction through the right leg of the core member 100 to the left along the member 100 to the center portion, up the center portion to the right along the armature 102 and across the air gap to the right leg of the member 100.

With the parts in the position shown in the drawing of Figure 2 core member 100 and the armature member 102 are in balanced position in relation to each other and thus the bridge circuit may be considered balanced.

However, upon movement of the armature 102 or the E-shaped core member 100 as previously described so as to decrease the air gap between the right leg of the member 100 and the armature 102 and increases the air gap between the left leg of the core member 100 and the armature 102, the flux through the coil 3' is increased thereby increasing the impedance of the coil 3'. On the other hand, the flux through the coil 4' decreases, decreasing the impedance of that coil. The bridge circuit 10' comprised of coils 3' and 4' and resistances 1' and 2' thus becomes unbalanced due to the increase in the impedance of the coil 3' and the decrease in impedance of the coil 4'. Therefore a potential difference exists between input terminals 25' and 26' affecting the amplifier and motor 132 in a manner previously described in reference to Figure 1. Similarly, upon the armature 102 and the core member 100 being shifted in relation to each other so as to decrease the air gap between the left leg of the core member 100 and armature 102 and increase the air gap between the right leg of the core member 100 and armature 102, the impedance of coil 4' is increased and the impedance of coil 3' is decreased, thereby causing an unbalancing of the circuit in the opposite direction.

Upon an increase in the impedance of coil 3' the motor means 132 revolves in a direction so as to turn the indicator 130 so as to designate an increase in altitude while the cams 127 and 125 are rotated in a counter-clockwise direction, thereby increasing the tension of the spring 134 for shifting the armature 102 back to a neutral position and shifting the pivot point 119 towards the right thereby varying the effect on the lever 112 of the spring 110 and bellows 116 so as to counteract the biasing effect of the spring 110. Thus the E-shaped core member 100 is pivoted under force of the bellows 116 on pivot member 101 in a clockwise direction and the armature 102 pivoted in a counter-clockwise direction so as to balance the impedance of the coils 3' and 4'. As will be readily seen, such balancing effect may take place in response either to a relative increase in temperature of the free atmospheric air or upon a decrease in atmospheric pressure applied at the aneroid 106 or both.

Upon movement of the armature 102 and core member 100 so as to decrease the air gap between the left leg of core member 100 and armature 102, and increase the air gap between the right leg of core member 100 and armature 102, the motor 132 will rotate in its opposite direction, thereby turning the indicator 130 so as to decrease the indicated altitude and turning the cams 127 and 125 in a clockwise direction. Such action decreases the tension applied by spring 134 upon the aneroid 106 and shifts the pivot 119 toward the left thereby increasing the biasing effect of spring 110 upon the lever 112 so that the lever 112 may be moved by spring 110 so as to shift the core member 100 in a counter-clockwise direction while the armature 102 is moved in a clockwise direction by the expansion of the aneroid 106. This action then lessens the air gap between the right leg of the core member 100 and armature 102 and increases the air gap between the left leg and said armature until the bridge circuit 10' is once again balanced. As will be readily seen, such balancing effect may take place in response either to a relative decrease in the temperature of the free atmospheric air or upon an increase in the atmospheric pressure applied at the aneroid 106 or both.

It will thus be seen that I have provided novel means for effecting temperature compensation in an altimeter. Although several embodiments of the invention have been illustrated and described in detail it is to be expressly understood that the invention is not limited thereto, and that various changes may be made in the design and arrangements of the parts without departing from the spirit and scope of the invention as the same will now be understood by those skilled in the art. For a definition of the limits of the invention, reference will be had primarily to the appended claims.

I claim as my invention:

1. A device of the character described, comprising, in combination, a variable reluctance bridge circuit, an E-shaped core member, said core member being pivotally mounted intermediate the opposite ends thereof, coils mounted on the end legs of said E-shaped core member, said coils forming opposite legs of said bridge circuit, an armature pivotally mounted at the center leg portion of said E-shaped core member, an atmospheric pressure responsive device, an atmospheric temperature responsive device, said armature being pivotally adjusted by one of said devices, and said core member being pivotally adjusted by the other of said devices, said armature and said core member being adjustably positioned for varying the impedance of said coils in such a manner as to unbalance said bridge circuit for performing a control function.

2. A device of the character described, comprising, in combination, a variable reluctance bridge circuit, an E-shaped core member, said core member being pivotally mounted intermediate the opposite ends thereof, coils mounted on the end legs of said E-shaped core member, said coils forming opposite legs of said bridge circuit, an armature pivotally mounted at the center leg portion of said E-shaped core member, an atmospheric pressure responsive device, an atmospheric temperature responsive device, said armature being pivotally adjusted by one of said devices, said core member being pivotally adjusted by the other of said devices, said armature and said core member being adjustably positioned for varying the impedance of said coils in such a manner as to unbalance said bridge circuit, motor means energized upon the unbalancing of said circuit, indicator means operated by said motor means, control means actuated by said motor means, and means connecting said control means with said E-shaped core member and said armature for rebalancing said bridge circuit to terminate energization of said motor means.

3. A device of the character described, comprising, in combination, a bridge circuit, a first member for controlling the electrical balance of said circuit, said first member being controlled by an atmospheric pressure responsive device, a second member for controlling the electrical balance of said circuit, an arm for actuating said second member, an adjustable pivot for pivotally mounting said arm, an atmospheric temperature responsive device for actuating one end of said arm and tension means for actuating the opposite end thereof for causing the unbalancing of said circuit, motor means energized upon the unbalancing of said circuit, and control means actuated by said motor means for varying the position of said adjustable pivot so as to cause the movement of said arm in a direction for rebalancing said circuit so as to terminate the action of said motor means.

4. A device of the character described, comprising, in combination, a bridge circuit, a first member, a second member positioned in spaced relation to said first member, said members being adjustable with respect to one another, atmospheric pressure responsive means for adjusting said first member in relation to said second member, atmospheric temperature responsive means for adjusting said second member in relation to said first member, said members comprising inductive impedance means included in said bridge circuit and means reluctively altering the relative impedances of said impedance means, whereby upon responsive variations in the relationship of said members said bridge circuit may be unbalanced, an indicator means, power means controlled by said bridge circuit for actuating said indicator means upon the unbalancing of said bridge circuit, control means actuated by said power means, and means connecting said control means with said members whereby to alter their relative adjustment for rebalancing said bridge circuit to terminate the action of said power means on said indicator means.

5. A device of the character described, comprising, in combination, a member movable in response to atmospheric pressure, a variable reluctance bridge circuit, a magnetic core mounted on said member and movable therewith, said bridge circuit including members inductively associated with said core for cooperating therewith to control the electrical balance of said bridge circuit, a first biasing means acting upon said member, an atmospheric temperature responsive device for varying the force exerted by said first biasing means in response to atmospheric temperature conditions, a second biasing means acting upon said member, motor means controlled by the unbalanced potential of said bridge circuit, indicator means operated by said motor means, and a pair of cams operated by said motor means, one of said cams varying the force exerted by said second biasing means upon said member in response to the adjusted position of said motor, and the other of said cams varying the force exerted by said first biasing means upon said member in response to the adjusted position of said motor, whereby said indicator means may be corrected for atmospheric temperature conditions in accordance with the atmospheric pressure level at which said temperature measurement is made.

6. A device of the character described, comprising, in combination, a member movable in response to atmospheric pressure, a variable reluctance bridge circuit, a magnetic core mounted on said member and movable therewith, said bridge circuit including members inductively associated with said core for cooperating therewith to control the electrical balance of said bridge circuit, a first biasing means acting upon said member, an atmospheric temperature responsive device for varying the force exerted by said first biasing means in response to atmospheric temperature conditions, a second biasing means acting upon said member, motor means controlled by the unbalanced potential of said bridge circuit, indicator means operated by said motor means, and adjustment means operated by said motor means for varying the forces exerted by said first and second biasing means upon said member, whereby an altitude recorded by said indicator means may represent a reading corrected for atmospheric temperature conditions at a rate determined by the atmospheric pressure level for which said altitude reading is based.

7. A device of the character described, comprising, in combination, atmospheric pressure responsive means, a balanced bridge circuit, said pressure responsive means causing unbalance of the circuit upon movement of said pressure responsive means from a first position to a second position, motor means energized by the unbalanced potential of said bridge circuit, an indicator means driven by said motor means, first biasing means adjusted by said motor means while driving said indicator means for returning the atmospheric pressure responsive means from said second position to said first position for balancing said bridge circuit, temperature responsive means movable from a first position to a second position in response to temperature change, said temperature responsive means causing unbalance of said circuit upon movement from said first position to said second position, and second biasing means adjusted by said motor means while driving said indicator means, said second biasing means being operatively associated with said temperautre responsive means for removing unbalance of said circuit due solely to said movement of said temperature responsive means.

8. A device of the character described, comprising, in combination, atmospheric pressure responsive means, a balanced bridge circuit, said atmospheric pressure responsive means causing unbalance of the circuit upon movement of said pressure responsive means from a first position to a second position, motor means energized by the unbalanced potential of said bridge circuit, an indicator means driven by said motor means, first biasing means adjusted by said motor means while driving said indicator means for returning the atmospheric pressure responsive means from said second position to said first position for balancing said bridge circuit, temperature responsive means movable from a first position to a second position in response to temperature change, connecting means whereby said change in position of said temperature responsive means may cause unbalance of said circuit, further means driven by said motor means while driving said indicator means, said further means including a cam and means operatively associating said cam with said connecting means for removing unbalance of said circuit due solely to said movement of said temperature responsive means.

9. A device of the character described, comprising, in combination, a variable reluctance bridge circuit, a pivotally mounted first member, a pivotally mounted second member, said second member positioned in spaced relation to said first member, and means for separately pivotally adjusting each of said members in relation to the other of said members, said members comprising inductive impedance means included in said bridge circuit and means reluctively altering the relative impedances of said impedance means, whereby upon variation in the relationship of said members said bridge circuit may be unbalanced.

10. A device of the character described, comprising, in combination, a variable reluctance bridge circuit, a pivotally mounted first member, a second member pivotally mounted on said first member, and control means for pivotally adjusting each of said members in relation to the other of said members, said members comprising inductive impedance means included in said bridge circuit and means reluctively altering the relative impedances of said impedance means, whereby upon variation in the relationship of said members said bridge circuit may be unbalanced.

11. A device of the character described, comprising, in combination, a variable reluctance bridge circuit, a pivotally mounted first member, a second member pivotally mounted on said first member, atmospheric pressure responsive means for pivotally adjusting one of said members in relation to the other of said members for varying the impedance of said bridge circuit, and atmospheric temperature responsive means for pivotally adjusting the other of said members in relation to said one member, said members comprising inductive impedance means included in said bridge circuit and means reluctively altering the relative impedances of said impedance means, whereby upon variation in the relationship of said members said bridge circuit may be unbalanced.

12. A device of the character described, comprising, in combination, a variable reluctance bridge circuit, a first member, a second member positioned in spaced relation to said first member, atmospheric pressure responsive means for biasing said first member in such a manner as to adjust the relation of said first member to said second member, and separate atmospheric temperature responsive means for biasing said second member in such a manner as to adjust the relation of said second member to said first member, said members comprising inductive impedance means included in said bridge circuit and means reluctively altering the relative impedances of said impedance means, whereby upon variation in the relationship of said members said bridge circuit may be unbalanced.

13. In an altimeter the combination comprising a bridge circuit, atmospheric pressure responsive means for causing unbalance of said bridge circuit, atmospheric temperature responsive means for causing unbalance of said bridge circuit, motor means energized upon the unbalancing of said bridge circuit, first means driven by said motor means for varying the effect of said atmospheric pressure responsive means upon said bridge circuit, second means driven by said motor means for varying the effect of said atmospheric temperature responsive means upon said bridge circuit, and altitude indicator means adjusted by said motor means, said first and second means being driven by said motor means so as to cause the rebalancing of said bridge circuit for terminating the operation of said motor means.

14. In an altimeter, the combination comprising, an atmospheric pressure responsive means, spring tension means biasing said atmospheric pressure responsive means in one direction, a first cam for varying the force of said spring tension means, a second cam for varying the force of said spring tension means, atmospheric temperature responsive means for adjusting the force of said spring tension means, and power means for adjusting said first and second cam means, said power means controlled by said atmospheric pressure responsive means.

15. In an altimeter, the combination comprising, atmospheric pressure responsive means, biasing means acting upon said atmospheric pressure responsive means, variable cam means for adjusting the force exerted by said biasing means upon said atmospheric pressure responsive means, and separate temperature responsive means for adjusting independently of said variable cam means the force exerted by said biasing means upon said atmospheric pressure responsive means.

16. In an altimeter, the combination comprising, an atmospheric pressure responsive member movable from a first to a second position, biasing means acting upon said atmospheric pressure responsive member, variable cam means for adjusting the force exerted by said biasing means upon said atmospheric pressure responsive member, separate temperature responsive means for independently adjusting the force exerted by said biasing means upon said atmospheric pressure responsive member, and power means controlled by said atmospheric pressure responsive member for adjusting said variable cam means in such a manner as to cause the return of said atmospheric pressure responsive member from said second to said first position.

17. In an altimeter, the combination comprising, an atmospheric pressure responsive member movable from a first to a second position, a leaf spring bearing upon said atmospheric pressure responsive member at a point intermediate the opposite ends thereof, said leaf spring fixedly mounted at one end, a temperature responsive means connected at the other end of said leaf spring for adjusting the biasing force exerted thereby upon said atmospheric pressure responsive member, a pair of variable cams, one of said cams bearing upon said leaf spring at a point at one side of said atmospheric pressure responsive member and the other of said cams bearing upon said leaf spring at a point at the other side of said atmospheric pressure responsive member, said cams adjusting the biasing force exerted by said leaf spring, and power means for adjusting said cams so as to cause the return of said atmospheric pressure responsive member from said second to said first position, said power means being controlled by said atmospheric pressure responsive member.

PAUL F. SHIVERS.